(12) United States Patent
Budd et al.

(10) Patent No.: US 6,305,897 B1
(45) Date of Patent: Oct. 23, 2001

(54) MULTI-PANEL PLATFORM ROLLSTOPS FOR WHEELCHAIR LIFT

(75) Inventors: Alfred L. Budd, Winamac, IN (US); Jacques M. Dulin, Palo Alto, CA (US); Ronald W. Goodrich, Logansport; Russell G. Antrim, Winamac, both of IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 09/293,075

(22) Filed: Apr. 16, 1999

Related U.S. Application Data

(63) Continuation-in-part of application No. 09/065,666, filed as application No. PCT/US98/11990 on Jun. 10, 1998, now Pat. No. 5,975,830.

(60) Provisional application No. 60/049,575, filed on Jun. 11, 1997.

(51) Int. Cl.[7] .................................................... A61G 3/06
(52) U.S. Cl. ......................... 414/540; 414/541; 414/546; 414/921
(58) Field of Search .................................. 414/540, 541, 414/921, 546

(56) References Cited

U.S. PATENT DOCUMENTS

| | | |
|---|---|---|
| 3,913,759 | 10/1975 | Deacor . |
| 3,984,014 | 10/1976 | Pohl . |
| 4,010,859 | 3/1977 | Ronian et al. . |
| 4,155,468 | 5/1979 | Royce . |
| 4,251,179 * | 2/1981 | Thorley .............................. 414/921 X |
| 4,252,491 | 2/1981 | Hock . |
| 4,273,217 | 6/1981 | Kajita . |
| 4,353,436 | 10/1982 | Rice et al. . |
| 4,474,527 | 10/1984 | Risner et al. . |
| 4,804,308 | 2/1989 | Hamblin et al. . |
| 4,958,979 | 9/1990 | Svensson . |
| 5,040,936 * | 8/1991 | Rhea ................................. 414/921 X |
| 5,158,419 | 10/1992 | Kempf et al. . |
| 5,253,973 | 10/1993 | Fretwell . |
| 5,261,779 | 11/1993 | Goodrich . |
| 5,316,432 * | 5/1994 | Smalley et al. .................. 414/921 X |
| 5,346,355 | 9/1994 | Riemer . |
| 5,373,915 | 12/1994 | Tremblay . |
| 5,401,135 | 3/1995 | Stoen et al. . |
| 5,556,250 | 9/1996 | Fretwell et al. . |
| 5,564,884 | 10/1996 | Farsai . |
| 5,636,399 * | 6/1997 | Tremblay et al. ............... 414/921 X |
| 5,672,041 | 9/1997 | Ringdahl et al. . |
| 5,865,593 * | 2/1999 | Cohn ................................ 414/921 X |
| 6,039,528 * | 3/2000 | Cohn ................................ 414/921 X |
| 6,062,805 | 5/2000 | Tremblay et al. . |
| 6,089,817 * | 7/2000 | Tauer ............................... 414/921 X |
| 6,203,266 | 3/2001 | Savaria et al. . |

FOREIGN PATENT DOCUMENTS

2106857 * 4/1983 (GB) ................................... 414/921

* cited by examiner

*Primary Examiner*—Steven A. Bratlie
(74) *Attorney, Agent, or Firm*—Woodward, Emhardt, Naughton, Moriarty & McNett

(57) ABSTRACT

Multipanel rollstops mountable on the outboard end of a wheelchair lift platform in which at least one upper panel of the rollstop folds down or telescopes to reduce the rollstop profile for stowage. Preferred embodiments include bifold, trifold or telescoping rollstops for underfloor or under vehicle lifts. In the extended multipanel position, rollstops of the invention provide increased rollstop height and occupant security in the intermediate and transfer positions of the lift as compared to non-folding or telescoping rollstops of the same stowage profile. The folding of telescoping of the rollstop is automatic upon lift stowage. In a preferred embodiment, the rollstop upper panel is folded or unfolded by a direction-reversing mechanical actuator through a contact arm which engages structure of the lift or stowage compartment, and operates automatically without requiring operator intervention. In the unfolded, deployed safety barrier configuration the top edge of the rollstops of the invention extend at least 7" above the platform, which is the critical minimum to stop a runaway wheelchair event.

30 Claims, 9 Drawing Sheets

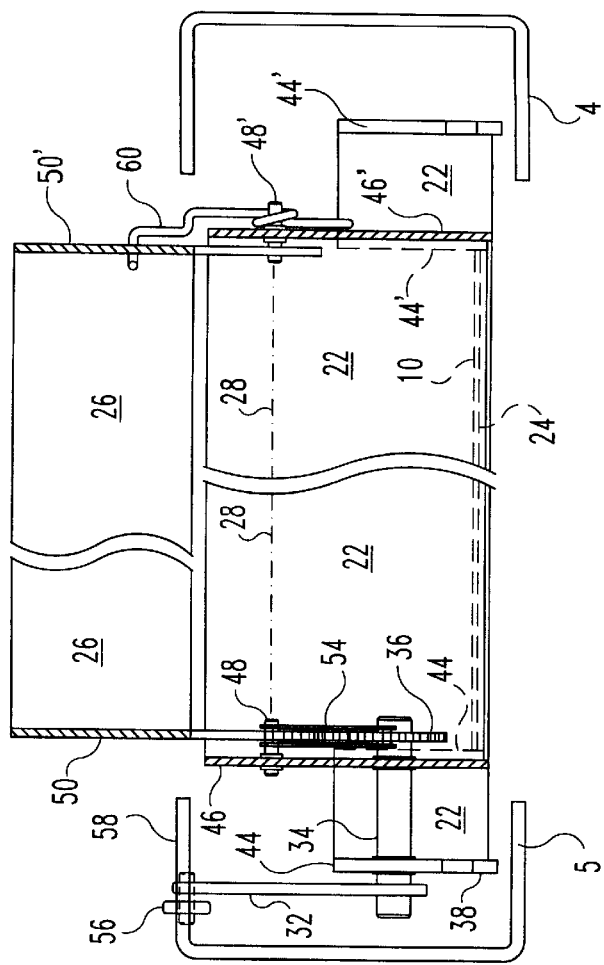
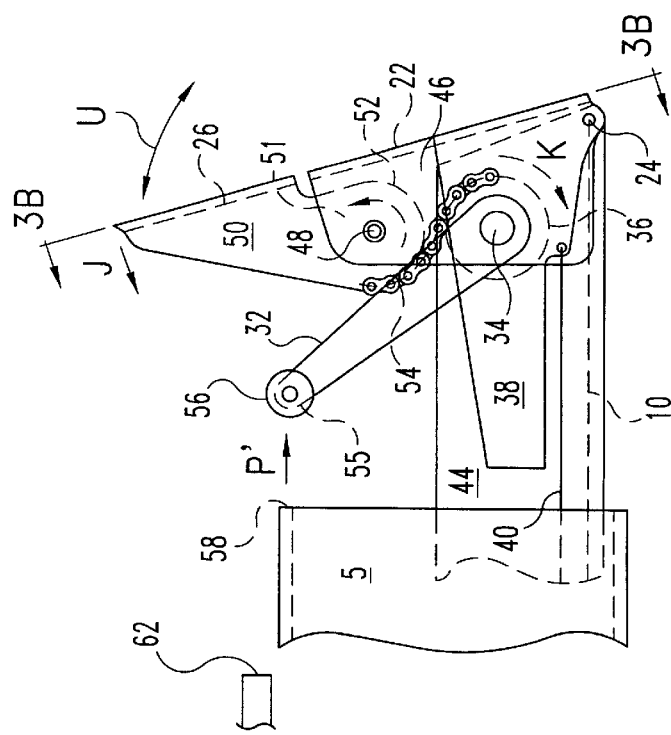
Fig. 3B
Fig. 3A

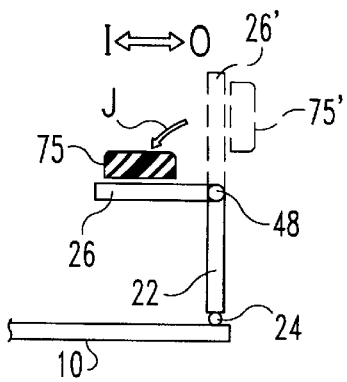
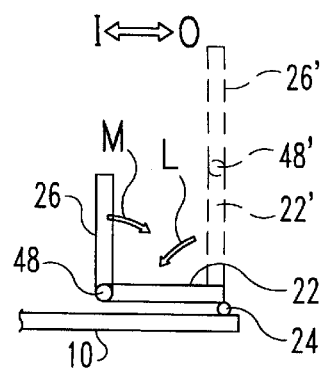
*Fig. 6A*  *Fig. 6B*
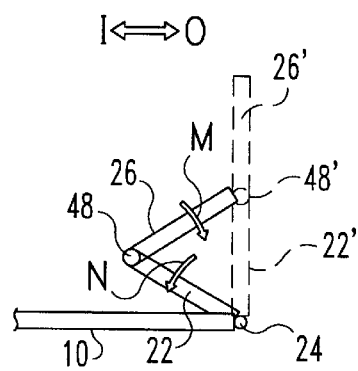
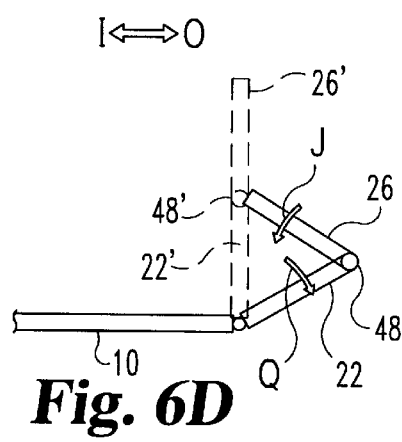
*Fig. 6C*  *Fig. 6D*
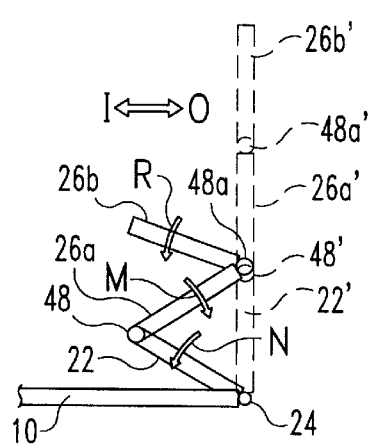
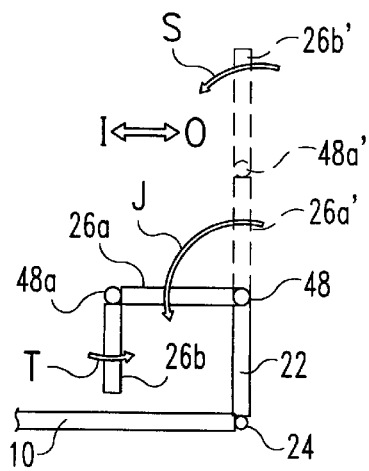
*Fig. 6E*  *Fig. 6F*

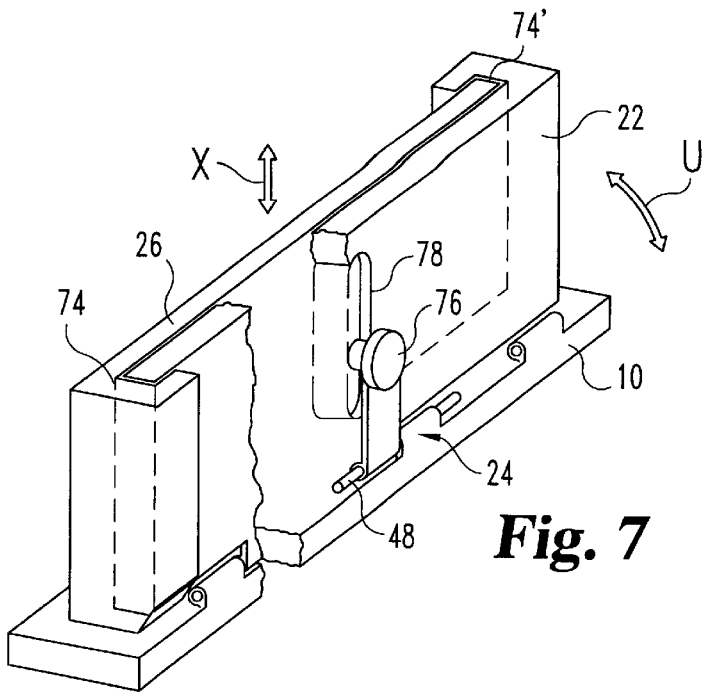
Fig. 7
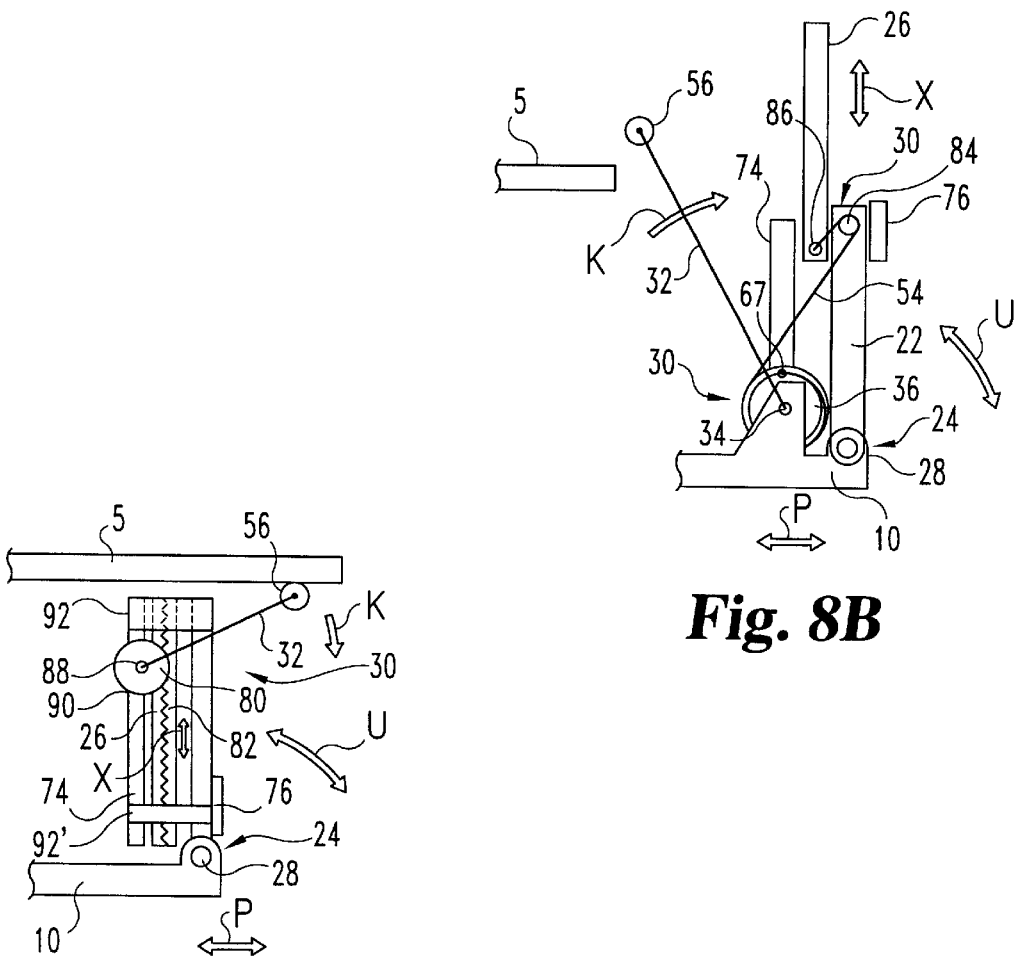
Fig. 8B
Fig. 8A

MULTI-PANEL PLATFORM ROLLSTOPS FOR WHEELCHAIR LIFT

CROSS REFERENCE TO RELATED CASE

This Application is a Continuation-In-Part of U.S. Regular application Ser. No. 09/065,666 filed Apr. 23, 1998 entitled UNDERFLOOR WHEELCHAIR LIFT now U.S. Pat. No. 5,975,830, which is the basis for the International Application PCT/US98/11990, filed Jun. 10, 1998. Said Application Ser. No. 09/065,666 is based on Provisional Application Ser. No. 60/049,575 entitled UNDER FLOOR LIFT filed Jun. 11, 1997 by the same Inventors. Applicants hereby claim the priority of each of these earlier filed applications pursuant to 35 U.S.C. §§ 119 and 120.

TECHNICAL FIELD

This application relates to wheelchair lifts for vehicles and more particularly to novel multi-panel outboard rollstop for mounting on the platform of a wheelchair lift. The rollstops are especially suitable for use on the outboard end of the platform of a wheelchair lift of the underfloor stowable type. The rollstops provide increased safety barrier height in the intermediate and transfer positions, are especially suited to stop runaway wheelchair events, have a lower stowage profile in the stowed position; and operate automatically without requiring operator intervention. Both folding and telescoping rollstops are disclosed with the preferred being bifold rollstops having a height of at least 7".

BACKGROUND ART

Platform-type wheelchair lifts of various types are employed in vehicles, and typically include a rollstop or other safety barrier at the outboard edge of the platform, to prevent wheelchairs from accidentally rolling off the platform when the platform is out of contact with the ground, such as a "runaway" wheelchair. Such platform safety barriers may be employed with a wide variety of kinds of platform-type wheelchair lifts, such as parallelogram lifts, underfloor lifts, undervehicle lifts, floor-mounted header/telescoping arm lifts, hydraulic sidelifts, rotary wheelchair lifts, dual lift-tube lifts, and the like.

A "runaway" wheelchair is a wheelchair that unexpectedly starts and uncontrollably rolls away. The Urban Mass Transportation Administration (UMTA) Guidelines Specifications for Active Wheelchair Lifts, for example, require an outboard barrier of a lift platform to stop a "runaway" wheelchair from running off the lift platform positioned at an "intermediate transfer level" (i.e., when the lift platform is disposed generally horizontal and elevated at a level to permit a wheelchair to transfer from the lift platform to the vehicle, and vice versa). The barrier must stop a wheelchair that is fully powered, from a standing start. The starting point must be disposed at least 48 inches away from the outboard barrier.

The height of an outboard barrier is very important to its effectiveness as a runaway wheelchair barrier. Testing has shown that in order to stop a fully loaded runaway wheelchair, i.e., an electric wheelchair loaded with a standard UMTA "adult" dummy (total of chair and dummy is 450 lbs.) is started 48" away and accelerated at full power on full battery charge, the barrier must extend at least 7" high or greater above the platform surface. Less than that height, the runaway wheelchair can climb the barrier and crash to the ground typically with the occupant hitting first and the heavy wheelchair following and striking the occupant. Thus a 7" or taller reinforced barrier is preferred, and is most effective when canted inward, typically at about an angle ranging from about 75° to about 89° to the platform floor.

In the under-floor type of wheelchair lift (herein generally "UFL"), the platform is retracted to a storage bay underneath the vehicle floor, and the rollstop is adapted to be retracted along with the rest of the platform assembly. An outboard rollstop is mounted, preferably by a hinge, at the outboard end of the platform. When the platform is above ground level, such as during lift or at the transfer level, the rollstop is positioned generally vertically (the deployed rollstop position) to form an outboard barrier. After the platform reaches ground level, the rollstop is lowered by rotating outwardly to the horizontal position (the ramp position) to allow the wheelchair and occupant to access or depart from the platform.

An example of an UFL employing an outboard platform rollstop is described in our co-pending application Ser. No. 09/065,666 filed Apr. 23, 1998 and entitled UNDERFLOOR WHEELCHAIR LIFT, which application is hereby incorporated by reference. In a lift of this type the platform is supported by bilateral parallelogram linkages from a generally U-shaped carriage frame. The carriage frame is in turn slidably mounted, typically on rollers, to telescope and nest within a U-shaped header frame mounted under the vehicle floor, being extended and retracted by a carriage drive means. With the carriage frame extended from the header frame so that the carriage arms extend outboard of the vehicle body, the platform may be reversibly moved by a lifting means between a transfer level in which it nests between the arms of the carriage frame, to a ground level, in which the platform is guided by the parallelogram linkage to rest on the ground or curb. With the platform at the transfer level nested between the arms of the carriage (and with accessories such as handrails folded or retracted) the carriage frame and platform may be retracted inboard into the header frame, so that it is stowed under the vehicle floor. The available vertical clearance for the carriage/platform mechanism is on the order of 4–4½".

In the UFL described in the aforesaid application Ser. No. 09/065,666, the rollstop is pivotally mounted to the outboard end of the platform by a piano-type hinge and is raised from its lowered ramp position to its vertical deployed position automatically by action of the platform lift system as the platform begins its ascent to the transfer level. The lift system comprises hydraulically powered lift chains which terminate at fittings on the rollstop, the rollstop thus being held in its vertical deployed position whenever lifting tension is applied to the lift chains.

In a typical UFL installation, such as in a transit-type bus, the rollstop remains in its vertically deployed position as the platform is stowed, and the rollstop overall height is limited to the height of the stair riser, to avoid obstruction of the stairway with the lift in the stowed configuration. This places a limit on the degree of security provided by the rollstop as a typical riser does not exceed 6" and the carriage stowage clearance is typically less than that, on the order of 4–5". In contrast, as described above, a rollstop height of 7" or greater is needed.

Simple removable or manually stowable rollstops place a significant burden upon the vehicle operator, particularly in a public transit setting, since significant operator time is required to deploy and stow the rollstop each time the lift is used.

Accordingly, there is a need in the art for an outboard rollstop which avoids restrictive height limitations for underfloor stowage, and which operates entirely automatically without operator intervention from initial deployment, through the lifting cycle and during return to stowage.

DISCLOSURE OF THE INVENTION

Summary, Objects And Advantages

This invention includes the following features, functions, objects and advantages in an improved multi-panel, telescoping or folding outboard rollstop assembly for a wheelchair lift platform. The rollstops of the invention may be easily adapted to be employed on all types of wheelchair lift platforms, but are particularly suited to UFL and undervehicle lifts (UVL), particularly UFL of the type which retract into a stowage bay under the floor of a vehicle, the storage bay clearance being typically less than the height of a typical vehicle stair riser. The rollstop height or profile in the vertically deployed position can be substantially greater than the height of the available storage bay clearance, indeed two times the height or more, since the rollstop of the invention avoids the height limitation of a simple pivoting rollstop by unfolding or telescoping upon deployment to the safety barrier configuration, and conversely retracting or folding during platform stowage. Linkage is provided which folds or telescopes an upper or lower segment of the rollstop, typically from about one-third to one-half the total rollstop height, downwardly to clear the vehicle floor in the stowed configuration. In the preferred foldable rollstop embodiment, the upper portion of the rollstop is stored in a generally horizontal (or below horizontal) position under the vehicle floor. In an important alternative, the lower rollstop panel is stored horizontally and the upper portion remains vertical or may also be folded.

The preferred folding multiple-pivot rollstops of the invention, in their several alternative embodiments as disclosed herein, retract for stowage by at least one folding motion on at least one secondary pivot axis and are thus referred to as "bifold rollstops" (even in cases where there are two or more secondary axes), to distinguish them from conventional rollstops having a single pivot axis at their platform mounting for pivoting the rollstop between the lowered ramp deployed position and the raised safety barrier position.

In the preferred embodiment, as the lift platform is retracted to the stowed position, the upper plate of the rollstop is folded so as to not project substantially above the height profile of the lower plate. In a UFL or UVL, in a first embodiment the lower portion or plate of the rollstop may remain generally vertical during retraction, and may serve as a riser (cover) plate for the storage bay when the lift is stowed. This permits a significantly higher and safer barrier upon rollstop deployment at the outboard end of the platform, particularly in cases of runaway wheel-chair events, while permitting a low and compact rollstop configuration for stowage. The folding/unfolding is accomplished entirely automatically without requiring operator intervention, and without the necessity of external power sources, or control circuitry. Other objects and advantages will be evident from the description, drawings and claims.

As used herein, "forward" or "front" refers to the front of the vehicle, "backward" or back" refers to the rear end of the vehicle, "outboard" or "distal" refers to away from the vehicle, and "inboard" or "proximal" refers to toward, or inward to the vehicle. Since the rollstop as a whole is rotatable from a lowered, generally horizontal ramp position to a raised, generally vertical safety position, the frame of reference for the relative positions of the various portions of the rollstop assembly changes in operation. For simplicity and clarity, the terminology used to describe rollstop elements herein, such as "upper" or "top", and "lower" or bottom, will generally reflect that the frame of reference will be the raised position or orientation of the rollstop (the raised safety barrier position).

The folding rollstops of the invention are multi-plate rollstops, in which two or more plates are pivotally joined along abutting edges, herein generically termed "bifold" whether in the form of two plates (preferred), or in three or more plates. Where three plates are used, the folding mechanism can result in a folded, generally "Z" or "inverted U" configuration, by way of example.

The two-plate bifold rollstop of the invention comprises a primary or lower plate ("primary plate") and a secondary or upper plate ("secondary plate"), each of which plates is laterally elongated and spans substantially the width of the platform outboard edge. The primary plate is pivotally mounted to the platform by a first pivot or hinge (platform hinge) located adjacent the lower edge of the primary plate and adjacent the outboard edge of the platform floor. The secondary plate is pivotally mounted by a second pivot (plate pivot or hinge) which is adjacent the lower (proximal) edge of the secondary plate and adjacent the upper edge of the primary plate.

For the telescoping embodiment, the secondary plate is guided in C-shaped tracks at each of the forward and rear edges of the primary plate. A vertical slot in the center of the primary plate can capture a sliding stud in the secondary plate to assist in maintaining the plates in sliding alignment. After the rollstop is unfolded, it rotates into the ramp position ("ramp deployed" position). In this orientation the secondary plate forms a generally horizontal, outward coplanar extension of the lowered primary plate. The secondary plate maintains this coplanar orientation as the rollstop is raised to the deployed safety barrier position. This coplanar orientation of the secondary plate relative to the primary plate is referred to as the unfolded or extended position of the secondary plate. This extension of the secondary plate increases the overall height of the deployed rollstop in the vertical position. As the lift platform is retracted to the stowed position, the secondary plate is folded with the upper (distal) edge of the secondary plate moving inboard towards the platform (inward direction) by a rotating mechanism. The secondary plate rotates or folds to a substantially lower height above the platform, preferably to at least a generally horizontal position or inclined below horizontal, so as to not project above the profile of the roll-stop primary plate.

The primary and secondary plates of the folding embodiment preferably rigidly abut at their respective adjacent edges when the secondary plate is in its unfolded position which prevents the secondary plate from rotating outboard beyond the plane of the primary plate, but allows rotation to fold inward. Alternatively, the plate pivot joining the secondary plate and primary plate may include one or more mechanical stops to limit outward (and/or inward) rotation. The plate pivot preferably comprises two or more hinges mounted spaced apart longitudinally along the junction of the primary and secondary plates. A bias spring is preferably mounted to act about the axis of the plate pivot to hold the secondary plate in the unfolded extended (vertical) position unless (until) it is driven by positive force to the folded position.

In the preferred embodiment, the secondary plate rotating or folding means is a direction-reversing mechanical actuator assembly which is mounted to at least one forward or back end of the rollstop and automatically folds the secondary plate during the platform retraction.

The actuator comprises a rotatable, spring-biased, lever arm which is oriented to contact and slidingly engage a portion of the lift support structure as the platform retracts to the stowed position, causing the arm to pivot in the outboard direction. The actuator assembly includes linkage member(s) which reverse and transfer the rotational motion of the arm to the secondary plate, causing the secondary plate to fold downward and inward. The engagement of the actuator arm may be with a portion of the lift support structure which is fixed relative to the vehicle, such as the outboard header frame channel or adjacent vehicle structure. Where the rollstop is folded into the alternate "L" configuration, the linkage can rotate the primary plate down (inboard) and the secondary plate outboard, and results in the secondary plate being vertical with the final stowed configuration so that the rollstop has a generally "L" shape.

In the principal embodiment, the actuator arm is fixedly mounted to extend generally radially from a drive shaft which is rotatably mounted (journaled) to the primary plate. The shaft in turn connects to a direction-reversing chain/pulley linkage which drives and controls the folding/unfolding of the secondary plate without any external power source or control mechanism, and with minimal mechanical complexity. The secondary plate is likewise automatically extended to its deployed, vertical position by the action of a bias spring when the platform is extended from its stowed position.

The lever arm drive shaft axis lies generally parallel to the axis of the second pivot joining the secondary plate and primary plate, and is pivotally supported by the primary plate, being journaled in a bracket or brackets mounted to the primary plate. The direction-reversing linkage may comprise a flexible tension means, such as a transfer chain or cable (preferably a chain), fixed or pinned at one end to the perimeter of a first (bottom) pulley, cam surface or chain roller which is fixed and co-axially mounted to the drive shaft. The other end of the transfer chain may be pinned to the perimeter of a second (top) pulley which is fixedly mounted to the secondary plate co-axially with the plate pivot, and which lies spaced apart from (above) the first pulley and in substantially the same plane as the first pulley.

In the preferred embodiment of the actuator assembly, the operating range of angular rotation of the first and second chain pulleys is about 180° or less. In this embodiment, the pulleys may be formed with curved perimeter arcs which engage the transfer chain. The arcs may be limited in length to match the pre-selected range of rotation, in the manner of the curved rocker-arm face commonly employed to drive reciprocating oil well pumps (donkeys). The second pulley may be formed integrally with a hinge bracket comprising a portion of the plate pivot mounted to the secondary plate. The transfer chain is preferably pinned to the first pulley on the outboard perimeter and to the second pulley on the inboard perimeter, giving the chain a generally S-shaped configuration. The linkage of the transfer chain between the pulleys causes the rotational motion of the drive shaft at one end of the chain to exert a rotational motion of the secondary plate about the pivot axis in the opposite direction. The direction-reversing linkage may be mounted to either side (or both) of the platform.

The actuator arm is preferably disposed to contact the inside surface of the upper flange of the header channel frame as the platform retracts into the header frame. The actuator arm preferably is positioned so as to rotate to lie below the flange as the secondary plate folds completely to stowage position. This position allows the actuator arm to be completely retracted under the floor following secondary plate folding. A suitably sized roller or rollers may be mounted to the end and/or sides of the actuator arm to reduce friction and wear when in contact with the header flange.

When the lift platform is deployed by telescoping outboard from the stowed position in the header frame, the motion of the actuator arm and secondary plate is reversed. As the actuator arm moves outboard from the end of the header frame flange, the arm begins to rotate under the influence of the bias spring, permitting the secondary plate to unfold until it is generally co-planar with the primary plate in the vertical, deployed safety barrier position.

As an alternative to the chain/pulley linkage described above, the direction reversing linkage may be a transfer cable/pulley linkage. In another alternative, the direction-reversing linkage may comprise a pair of mutually engaged gears, one mounted to drive shaft and one mounted to the secondary plate pivot portion. The S-shaped transfer chain is preferred for its mechanical simplicity, economy, its compatibility with pulleys formed of simple stamped metal components with a minimum of machining, and because it does not require high precision in the relative positioning of the pulleys and alignment of the drive shaft and hinge axes.

As stated above, the bifold rollstop of the invention may be easily adapted to use with other types of platform lifts other than the UFL type. In particular, it may be used with under vehicle lifts (UVL) and lifts mounted to the entry sill of a vehicle side or rear door, such as the parallelogram type wheelchair lifts which are offered by a number of manufacturers, including The Braun Corporation of Winamac, IN in its L900 series of lifts and by Ricon Corporation of Pacoima, Calif. in its R and S-series of lifts. For example, the bifold rollstop may be employed in connection with the lift shown in Braun U.S. Pat. No. 5,261,779, the disclosure of which is incorporated by reference. In the parallelogram-type lift, the actuator arm may be positioned to contact portions of the lift structure which although not fixed with respect to the vehicle, are in motion relative to the platform as the platform approaches the generally vertical platform stowed position, such as the parallelogram lift arm linkages, thereby folding the secondary plate to reduce rollstop horizontal profile, so that the rollstop edge does not intrude inboard towards the vehicle interior. The rollstops of the invention also may be applied to header style and rotary arm lifts.

In this embodiment the outboard face of the upper plate of the bifold rollstop may be padded, so that upon stowage of the parallelogram lift, the padding face is facing inboard, a feature providing safety cushioning in the event an occupant is thrown into the lift in an accident.

In the telescoping embodiment the secondary plate extends and retracts in a plane closely parallel to the primary plate and thus the plates are considered substantially coplanar. The secondary plate typically overlaps the primary plate a small amount in the vertical safety barrier orientation. Upon rotation outwardly to the ramp deployed position the overlap presents only a minor ridge, typically no more than the thickness of the secondary plates for the wheelchair to traverse.

BRIEF DESCRIPTION OF THE DRAWINGS

The invention is described in more detail in the accompanying drawings, in which:

FIGS. 3A, 3B and 3C are detailed views of the bifold rollstop of the invention as mounted to the outboard portion of a UFL platform assembly of FIG. 1; FIG. 3A being a side elevation view; FIG. 3B being a frontal section view looking inboard along line 3B–3B of FIG. 3A, with the rollstop in its raised, unfolded deployed safety position showing also the outboard portion of header frame of the UFL; and FIG. 3C being an isometric exploded view;

FIG. 4B showing an intermediate plate position and FIG. 4C showing the rollstop with the secondary plate folded;

FIGS. 6A-F are schematic side views of alternative bifold rollstop embodiments in both the raised and folded positions, FIG. 6A being the preferred embodiment shown in FIGS. 1–5; FIG. 6B being an "L" fold embodiment in which the folded primary plate lies parallel to the platform and the folded secondary plate lies perpendicular to the platform; FIGS. 6C and 6D being "Z" fold and "V" fold embodiments, respectively, in which the primary and secondary plates both fold to a canted angle with respect to the platform, with the plate hinge being folded inboard and outboard respectively, and FIGS. 6E and 6F showing "trifold" (three plate) rollstops in two different fold configurations;

FIG. 7 is an isometric view, partly broken away, showing one embodiment of a telescoping rollstop with end channel and stud-in-slot guides; and FIG. 8A and 8B are schematic side elevations showing two examples of linkages for raising and lowering the telescoping secondary plate; FIG. 8A showing a reversing gear assembly, and FIG. 8B showing a reversing cable or chain assembly.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believe to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications and patent applications cited in this specification are herein incorporated by reference as if each individual publication or patent application were specifically and individually indicated to be incorporated by reference.

Figure 1:
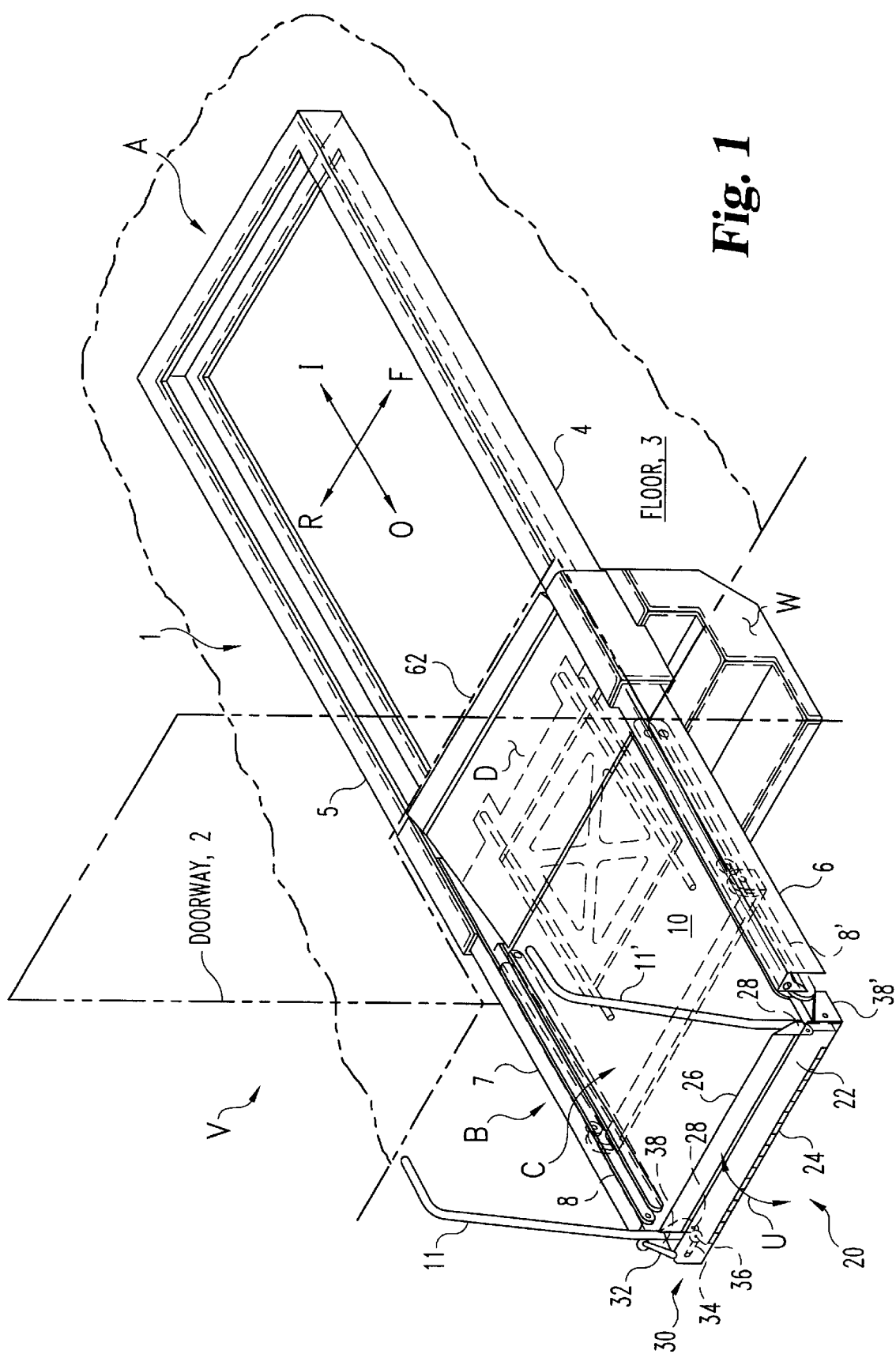
FIG. 1 is an isometric view of a typical underfloor lift (UFL) including the preferred bifold rollstop embodiment of this invention as mounted at the top of a bus-type step well, the lift being shown fully extended and at the vehicle floor level transfer position with the rollstop in its raised configuration.

FIG. 1 is an isometric view of an exemplary vehicle-side-mount installation of a typical UFL 1 as mounted at the top of a bus-type step well W, the lift being shown fully extended outboard through a side doorway 2 of the vehicle V at the transfer level adjacent the vehicle floor 3 (shown as phantom lines) and including the bifold rollstop assembly 20 of this invention in its raised, deployed, safety barrier configuration. The outboard and inboard directions are indicated by Arrows 0 and I, respectively, and the vehicle forward and rearward directions are indicated by Arrows F and R, respectively. The outboard edge of the vehicle floor at the top of the stepwell W is indicated at 62. As seen best in FIG. 5 the UFL retracts under this floor with rollstop primary plate 22 forming a portion of the riser.

The UFL 1 comprises a generally U-shaped header frame A mounted under vehicle the vehicle floor, a generally U-shaped carriage frame B which telescopingly nests within the header frame A between header frame front and rear channels 4 and 5, and a platform assembly C nestable and supported between the forward and rear carriage frame arms 6 and 7 respectively. With the UFL 1 at this transfer level position, the front and rear parallelogram linkage assemblies 8, 8' are hidden, being retracted and nested in the gap between the carriage frame arms 6, 7 and the platform assembly C. A bridge plate assembly D spans between the platform assembly C and the vehicle floor 3. The sway brace portion 9 of the bridge plate assembly D slidably connects the carriage frame B to the platform assembly C during platform motion, and is retracted and hidden beneath the bridgeplate D and platform floor 10 at this transfer level UFL position. Foldable handrails 11, 11' are mounted at the outboard corners of platform assembly C.

FIG. 1 shows the preferred rollstop assembly 20 of the invention pivotally mounted at the outboard end of the platform assembly C. The primary rollstop plate 22 (proximal to the platform) is mounted to the outboard edge of platform floor 10 by hinge or pivot 24, which is preferably a piano-type continuous hinge, but alternatively may be a plurality of spaced, short hinges. The secondary rollstop plate 26 is pivotally mounted to the upper edge of the primary plate 22 by one or more forward and rear plate pivots 28, 28'. The plates 22 and 26 span substantially the width of the platform assembly C. The direction-reversing actuator assembly 30 is shown mounted to the rear side of the rollstop assembly 20, and including actuator arm 32 mounted to drive shaft 34 and chain roller or pulley 36. Note that the direction-reversing actuator assembly 30 alternatively may be mounted at the forward side of the rollstop assembly.

Figure 2:
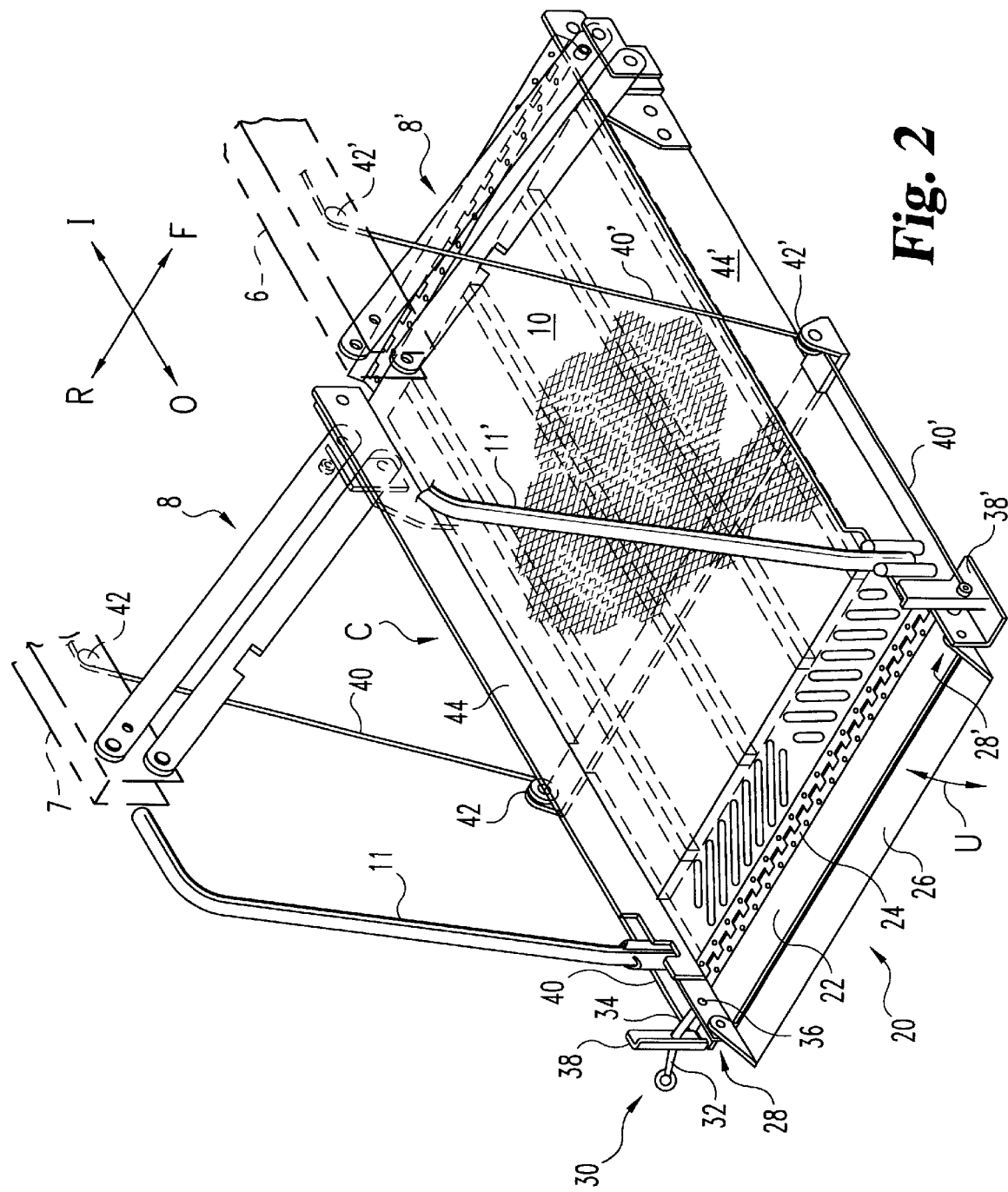
FIG. 2 is a detailed isometric view of the platform assembly of the UFL shown in FIG. 1, the platform being shown lowered to the ground position and showing the bifold rollstop of the invention in its lowered (ramp deployed) position.

FIG. 2 is an isometric view of a the platform assembly C and outboard end portions of the front and rear carriage arms 6, 7 (shown in phantom lines) of the UFL of FIG. 1, with the platform assembly C lowered to ground level and the rollstop 20 of the invention in its lowered, ramp, deployed position. The parallelogram linkage assemblies 8, 8' are shown extended downward from the outboard ends of the front and rear carriage arms 6, 7 to support the inboard corners of the platform assembly C. The platform assembly C is lifted and lowered by the forward and rear lift chains 40, 40' which are extend downward from the front and rear carriage arms 6, 7 to engage platform lift pulleys 42, 42' mounted to the midsections of the platform side beams. 44, 44'. The lift chains 40, 40' are retracted and extended by an hydraulic cylinder system (not shown) housed in the carriage frame (B in FIG. 1). The anti-sway telescoping bridge-plate assembly is not shown.

Note that the lift chains pass around the platform lift pulleys 42, 42' and extend forward to anchor to the rollstop latch plates 38, 38' which are fixedly mounted to each end of the primary rollstop plate. In this preferred UFL embodiment, tension exerted by the lift chains 40, 40' as platform lifting is initiated, automatically causes the rollstop 20 to rotate to the raised safety position and hold the rollstop firmly against the platform side plates 44, 44' to lock the primary plate 22 of the rollstop in the raised, deployed safety position so as to resist force and impact from a run-away wheelchair. In like manner, the release of tension on chains 44, 44' upon descent of the platform to ground level permits the rollstop 20 to lower by gravity to its ramp deployed (horizontal) position for wheelchair entry/exit out of from the platform. Thus, in this embodiment, the locking means for securing the rollstop in its raised safety barrier position is integrated with the platform lifting means for fully automatic operation. Alternatively, in lift embodiments where the lift chains, or other lift means, are mounted to the platform without linkage to the rollstop, a separate conventional rollstop locking means may be mounted to the rollstop and/or platform to secure the rollstop in its raised safety barrier position The rollstop actuator assembly 30 is mounted on the rearward end of rollstop assembly 20, and comprises actuator arm 32 which is fixedly mounted to extend radially from drive shaft 34 adjacent the rearward side of the rear latch plate 38. Drive shaft 34 passes through and is journaled in an aperture in the latch plate 38 and extends parallel to the axis of rollstop hinge 24 to mount chain pulley 36 adjacent to rear plate pivot 28. As shown, the length of shaft 34 is exaggerated in order to be visible in this figure.

Figure 3C:
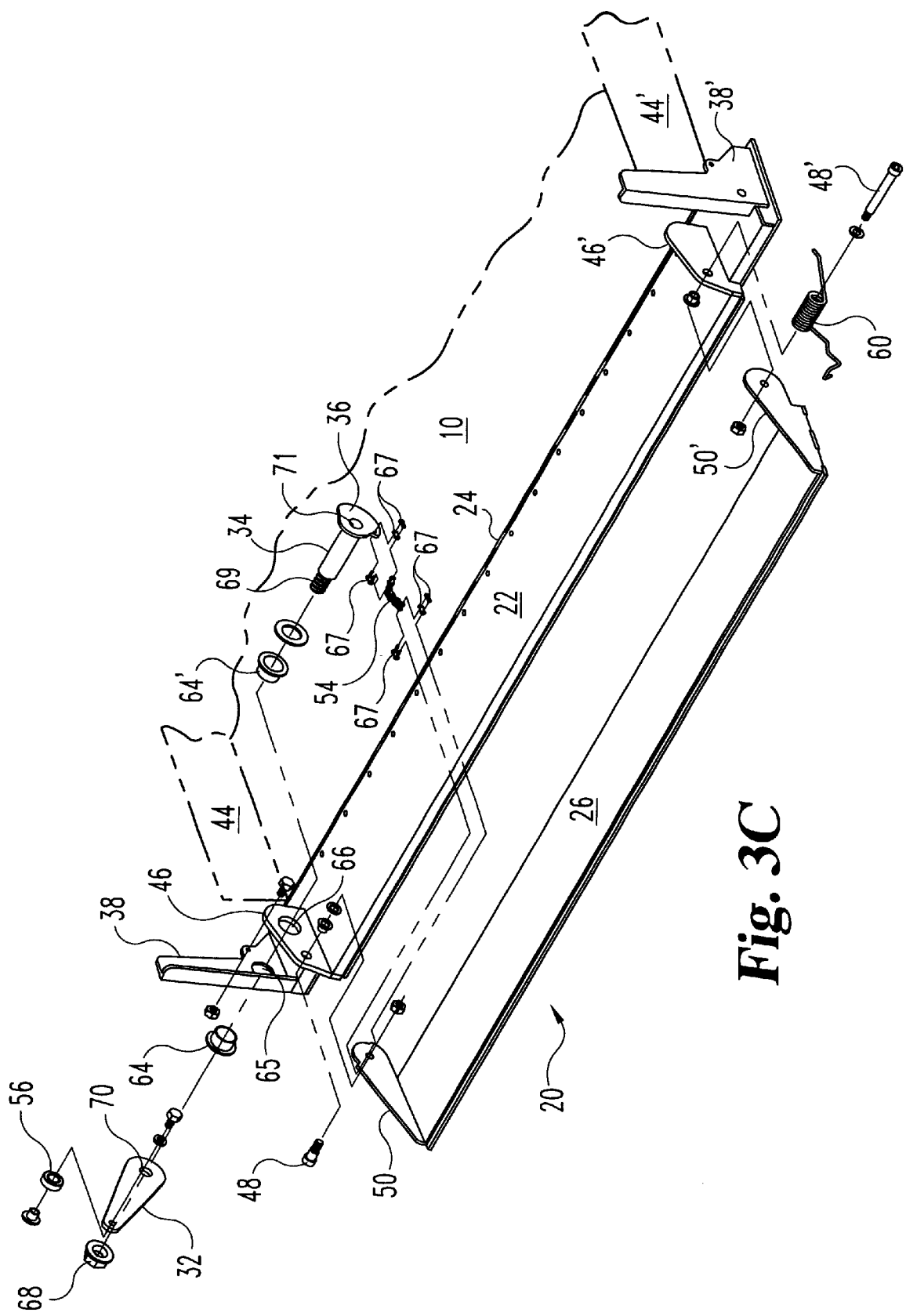
Figure 4A:
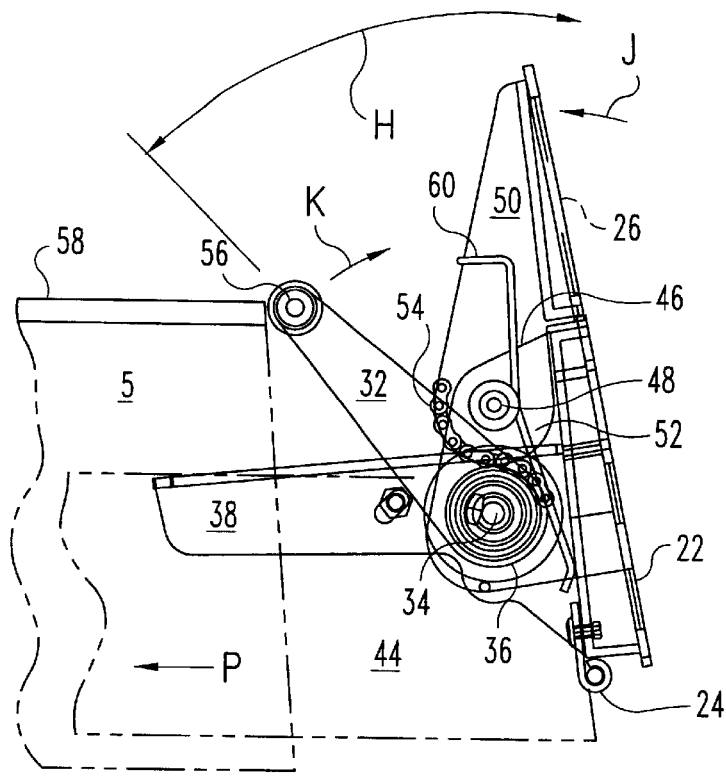
FIGS. 4A, 4B and 4C are three side elevation views of the hinge brackets, chain/pulley linkage and actuator arm of the rollstop of the invention and the outboard portions of the platform assembly and the upper flange of the header frame channel of the UFL of FIG. 1, FIG. 4A showing the rollstop with the secondary plate unfolded.
Figure 4B:
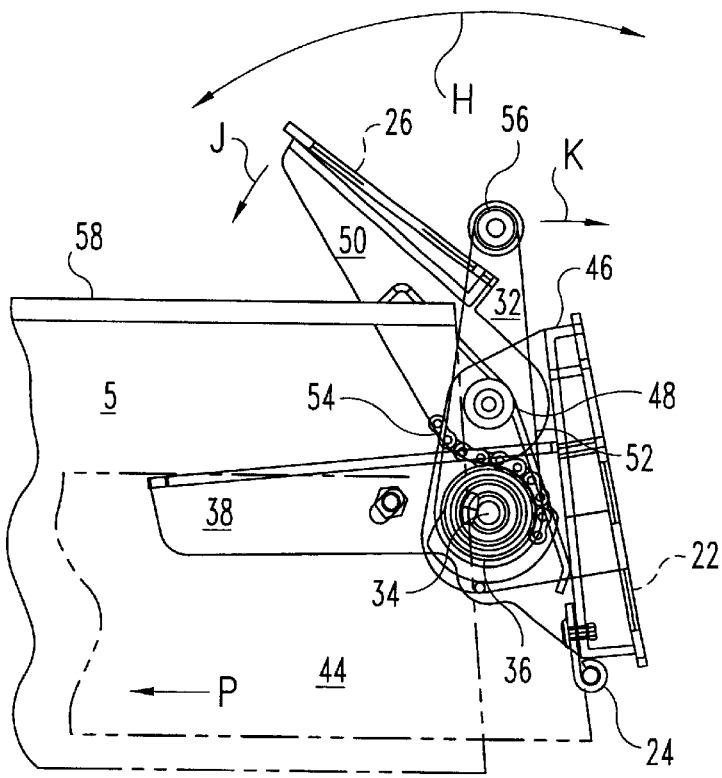
Figure 4C:
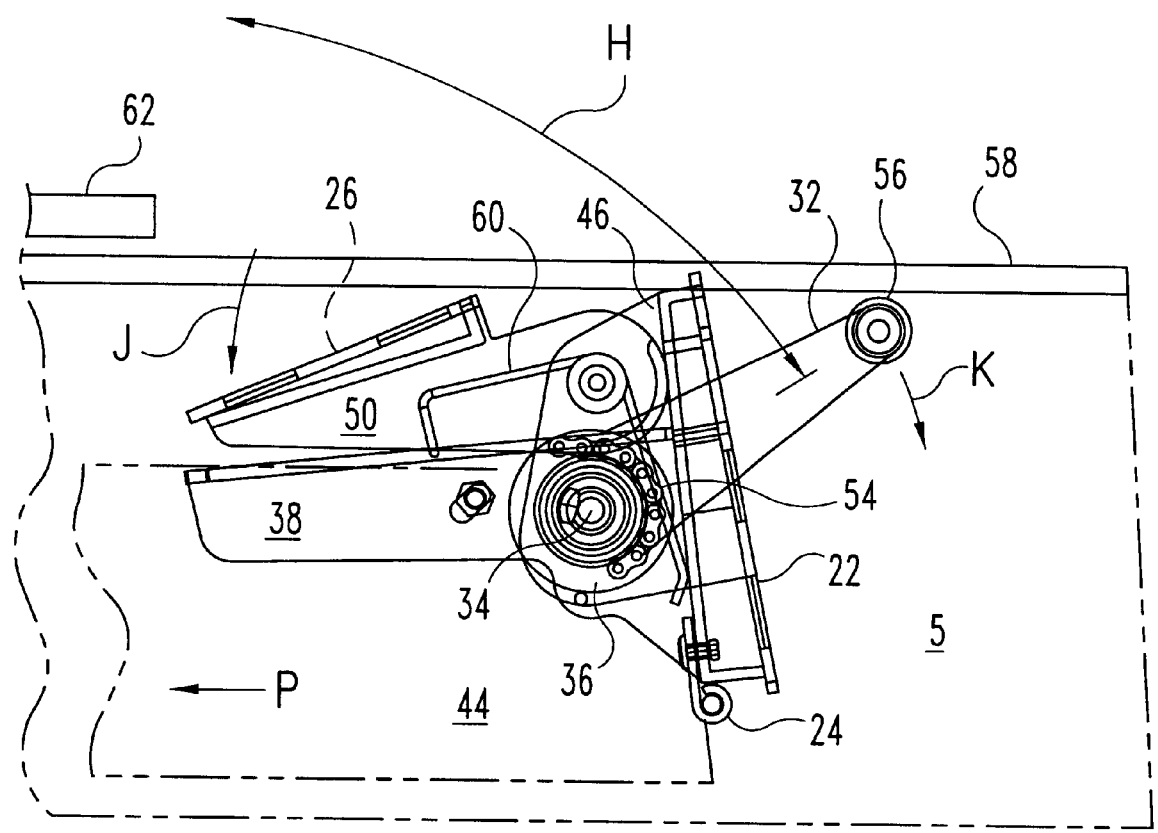

FIGS. 3A, B, C and 4A, B, C show the detailed structure of the rollstop 20 of the invention. FIGS. 3A and 3B are a side elevation view and a frontal section view looking inboard along line 3B–3B respectively of the rollstop 20 in its raised, unfolded (deployed safety barrier) position, showing also the outboard portions of the platform assembly and header frame of the UFL of FIG. 1. FIG. 3C is an exploded isometric view of the preferred bifold rollstop mounted to the UFL platform, with the outboard portion of the platform shown in phantom. FIGS. 4A, 4B and 4C are three side elevation views of the direction-reversing actuator assembly of the rollstop, showing the outboard portion of the upper header flange 58 and the outboard portion of the platform side beam 44, FIG. 4A showing the secondary plate 26 unfolded; FIG. 4B showing an intermediate plate position; and FIG. 4C showing the secondary plate 26 folded.

As seen in FIGS. 3A, 3B and 3C, the primary plate 22 is pivotally mounted by means of rollstop hinge 24 to platform floor 10, and the primary plate brackets 46, 46' are mounted to the primary plate 22 adjacent each end, extending perpendicularly inboard to lie adjacent to the platform side plates 44, 44'. The secondary plate 26 is supported by secondary plate brackets 50, 50' fixedly mounted adjacent each end thereof extending perpendicularly inboard. The lower portion of the upper bracket 50 overlaps and lies adjacent to the upper portion of the lower bracket 46. The brackets 46, 50 are pivotally joined by plate hinge pins 48, 48'. These pins comprising the plate pivot axis 28. As seen in FIG. 3B, a bias spring 60 is mounted on at least one end of the secondary plate 26 spanning between the secondary and primary plates 26 and 22, acting about the axis 28 of hinge pins 48, 48', so as to tend to hold the secondary plate in an unfolded (raised, safety barrier) position. The relative position of the vehicle floor 62, beneath which the UFL lift platform 10 within header channels 4, 5 retracts is shown in FIG. 3A.

The exploded isometric view of FIG. 3C also shows clearly the assembly of the various rollstop elements described above, the dashed projection lines showing the spatial relationship of the elements when assembled. The platform floor 10 and side beams 44, 44' are shown in phantom lines. In particular, the shaft 34 can be seen to pass through a pair of shaft journal bearings 64, 64' mounted respectively in an aperture 65 in latch plate 38 and an aperture 66 in primary plate (bottom) bracket 46. A first shaft end 69 is fixedly mounted to arm 32 by insertion in keyed arm aperture 70 and held by shaft end nut 68. A second shaft end 71 is fixed to contoured (cam-surfaced) chain pulley 36. Transfer chain 54 can be seen to be fastened at one end to chain pulley 36 and at the other end to secondary plate. (top) bracket 50 by pairs of chain connector links 67.

As best seen in FIGS. 4A, 4B and 4C, the top bracket 50 has a rounded lower portion 51 perpendicular to the axis of hinge pin 48 with a perimeter 52 of semicircular shape centered on hinge pin 48. Drive shaft 34 lies generally parallel to and spaced apart from the axis 28 of pivot 48, the shaft 34 being journaled in at least one of the lower bracket 46 and the rollstop latch plate 38. Chain pulley 36 is fixedly mounted adjacent the forward end of shaft 34 (the end closest to the platform centerline) lying substantially in the same plane as the lower portion 51 of top bracket 50. Transfer chain 54 is pivotally attached at one (top) end to the inboard side of perimeter 52 and engages it to extend downward and outboard therealong in the manner of a chain on a chain pulley. The other end of the transfer chain 54 engages and is pivotally fastened to the outboard perimeter of chain pulley 36, on the end of shaft 34 the transfer chain forming a generally S-shape when the rollstop is in the unfolded (safety barrier) configuration. The clearance between the perimeter 52 and chain pulley 36 and the degree of slack in chain 54 may be selected to be small enough to maintain the chain securely engaged on the respective perimeters while permitting rotation. Alternatively, the perimeter 52 and chain pulley 36 may have sprocket-type teeth to engage the chain 54, or the chain or cable may be trapped in a groove to prevent lateral wander and disengagement from the periphery 52 and chain pulley 36.

Actuator arm 32 is mounted to the rear end (the end farthest from the platform centerline) of shaft 34, extending radially from the shaft. The lengths of arm 32 and shaft 34, and the angular position of arm 32, are selected so that the end 55 of arm 32 contacts the outboard end of header frame channel upper flange 58 (the portion of the header channel 5 below the upper flange 58, and the platform side beams 44, are shown in phantom lines) as the platform is retracted in the direction of Arrow P. The arm end 55 may be fitted with tip roller 56 at the point of contact to reduce friction during contact with header flange 58. The contact of roller 56 with flange 58 exerts a force on the arm 32 in the opposite direction (Arrow K) causing clockwise rotation of shaft 34. The transfer chain 54 in turn winds about chain pulley 36, pulling on the perimeter 52 of bracket 50, thereby causing the secondary plate 26 and bracket 50 to rotate in a counterclockwise direction in the direction of Arrow J, folding the secondary rollstop plate 26. This is shown in the progression of FIGS. 4A, 4B, 4C.

The continued retraction of the platform causes the end 55 of arm 32 to move through Arc H relative to shaft 34. As the end 55 and tip roller 56 rotates below the level of header flange 58, the rotation of shaft 34 ceases. Note that in the intermediate plate position shown in FIG. 4B, the leading edge of the header channel 58 slides along the inboard surface of arm 32. Note that in FIGS. 4A–C the bias spring 60 is shown mounted to upper bracket 50, although the spring 60 may be mounted to either or both sides of the rollstop 20 acting about the axis 28 of hinge pins 48, 48'.

Figure 5:
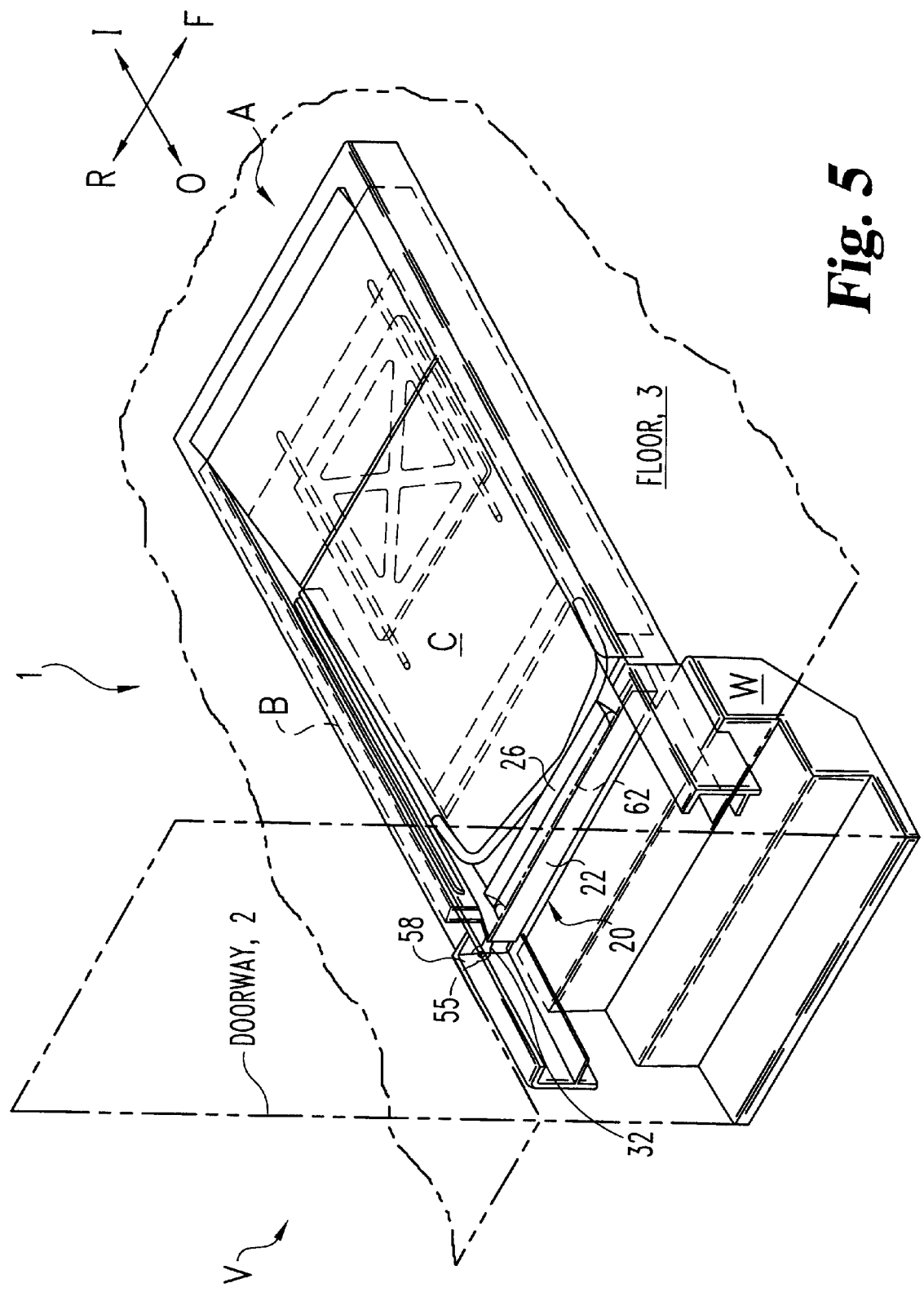
FIG. 5 is an isometric view of the UFL of FIG. 1, the lift being shown retracted into its storage bay with the rollstop of the invention in its folded configuration.

FIG. 5 shows an isometric view of the UFL of FIG. 1, the lift platform C and carriage frame B being shown retracted into the header frame A under floor 3 with the rollstop 20 of the invention in its folded configuration. Note that end 55 of actuator arm 32 is retracted underneath header flange 58. The respective radii of chain pulley 36 and perimeter 52 and the length of transfer chain 54 may be selected so that the secondary plate reaches the desired degree of folding as the rotation of shaft 34 ceases (as shown in FIG. 4) and the secondary plate 26 is free (low enough in folded profile) to retract underneath the stairway lip 62 of floor 3. Referring to FIGS. 4 A–C, it can be seen that the angular movement of both the secondary plate 26 and the shaft 34 is typically less than 180° and generally about 100°. Thus, the perimeter of the chain pulley 36 and upper bracket perimeter 52 need only be formed to receive and engage the transfer chain 54 over a like angle.

During extension of the platform C from its stowed position, the movement of arm end 55 outboard of the end of flange 58 allows the arm 32 to rotate and the secondary plate 26 to unfold under the force exerted by the bias spring (60 in FIG. 3B). This is evident by viewing the progression of FIGS. 4C, 4B, 4A.

FIGS. 6A–F are schematic side views of a series of alternative bifold (and trifold) rollstop embodiments, shown in each figure in both the raised barrier position (dashed lines) and stowed or folded position (solid lines) mounted to the outboard end of platform floor 10, Each of FIGS. 6A–F has the same orientation with respect to the platform, the inboard and outboard directions being indicated by Arrows I and O respectively. In each figure, the lowered profile of the stowed rollstop is achieved by a different folding configuration, and the folding employ the principles described above, with the elements reversed where needed to accomplish the inverse folding (as compared to FIGS. 1–5) as shown.

FIGS. 6A–F are schematic side views of a series of alternative bifold (and trifold) rollstop embodiments, shown in each figure in both the raised barrier position (dashed lines) and stowed or folded position (sold lines) mounted to the outboard end of platform floor 10. Each of FIGS. 6A–F has the same orientation with respect to the platform, the inboard and outboard directions being indicated by Arrows I and O respectively. In each figure, the lowered profile of the stowed rollstop is achieved by a different folding configuration, and the folding configurations employ the principles described above, with the elements reversed where needed to accomplish the inverse folding (as compared to FIGS. 1–5) as shown.

FIG. 6B shows an alternative "L" fold embodiment, in which in the folded configuration the primary plate 22 rotates as shown by arrow L to lie generally parallel to the platform and the secondary plate 26 remains generally perpendicular to the platform (it actually rotates relative to plate 22 as shown by Arrow M).

In the alternative rollstop embodiments shown in FIGS. 6B–D, the rollstop locking means may be suitably and conventionally adapted to permit the primary plate 22 to rotate upon platform stowage, inboard or outboard from its raised generally vertical barrier configuration. Likewise, the secondary plate linkage may be suitably and conventionally adapted to permit the secondary plate 26 to rotate outwards about hinge 48 relative to the primary plate 22, rather than inwards as in the preferred rollstop embodiment.

FIG. 6C shows an alternative "Z" fold embodiment in which in the folded configuration both the primary and secondary plates 22, 26 rotate as shown by Arrows M and N to a canted angle with respect to the platform, with the plate hinge 48 being moved inboard during rotation of the plates. Optionally the rotation may continued until both plates are "stacked" generally parallel to the platform in an accordion-type stowage.

FIG. 6D shows an alternative "V" fold embodiment in which in the folded configuration both the primary and secondary plates 22, 26 rotate as shown by Arrows J and Q to a canted angle as in FIG. 6C, but with the plate hinge 48 being moved outboard during rotation of the plates. As in FIG. 6C, optionally the rotation may be continued until both plates are generally parallel to the platform in an accordion-type stowage.

FIG. 6E shows a trifold arrangement in which the upper plate 26 is configured as multiple plates 26a and 26b, shown raised as 26a', 26b' in phantom. A hinge 48a like hinge 48 is provided between plates 26a and 26b, and is shown in the deployed barrier safety position as 48a' The three barrier plates fold as shown by Arrows R, M and N, the folding of plates 22 and 26 being like FIG. 6C.

FIG. 6F shows an alternate folding of the triple plate barrier of FIG. 6E. Plate 26b may fold first from position 26b' to a right angle to plate 26a' as shown by Arrow S, or plate 26a' may fold first as shown by Arrow J, followed by the fold of plate 26b' to the position of 26b as shown by Arrow T.

In still other embodiments, the lever arm, rather than rotating the secondary plate on a pivot at the upper edge of the primary plate, raises the second plate upwardly from a lowered position in a plane parallel to said primary plate. In this telescoping embodiment, the secondary plate may be raised by cams, gears or a chain/cable linkage attached at one end to the pulley surface of the lever arm, looped up over a roller at the upper edge of the primary plate, and then downwardly to attach to the lower end of the secondary plate. In these telescoping embodiments, the secondary plate is guided in C-shaped tracks at each of the forward and rear edges of the primary plate. A vertical slot in the center of the primary plate can capture a sliding stud in the secondary plate to assist in maintaining the plates in sliding alignment. These are described in more detail with respect to FIGS. 7, 8A and 8B, below.

FIG. 7 is an isometric view of a telescoping outboard rollstop embodiment of the invention, with portions broken away to simplify the illustration. The secondary plate 26 vertically extends upwardly and retracts downwardly as shown by Arrow X, while the entire rollstop assembly pivots downwardly on the hinge and pin assembly 24, 48 at the lower edge of the primary plate 22 as shown by Arrow U. The hinge attachment to the platform 10 is as in the folding embodiments illustrated in FIGS. 1 through 6 above. C-shaped guides 74 and 74' at each end of the telescoping plate 26 assembly permits the secondary plate to slide with respect to the primary plate 22. At the left end of FIG. 7, the guide 74 is shown as a J-shaped extension of the secondary plate 26, while at the right end of FIG. 7 the guide channel 74' is shown as an extension of the primary plate 22. This illustrates that the guide channel 74, 74' may be the same at both ends, mirror images as shown in FIG. 7, or any other suitable arrangement, such as a small strip 90 supported by cross brackets 92 and 92' as shown in FIG. 8A. One skilled in the art will understand that any suitable guide arrangement may be employed.

In addition, the primary plate 22 conveniently includes one or more slots 78, shown partially broken away, through which is fitted a stud 76 to capture the secondary plate and maintain it in sliding alignment. As shown, the stud/slot 76, 78 is shown in the approximate lateral midpoint of the rollstop (approximately on the inboard-outboard axis of the platform 10, but it is clear that a plurality of such slots may be employed spaced at suitable intervals along the extent of the rollstop. In addition, the stud/slot may be reversed, with the stud projecting from the primary plate through a slot in the secondary plate. Alternating location of the stud on primary and secondary plates may be used. The slot clearance is sufficient to permit easy sliding without binding. The underside surfaces of the stud, or the face of the plate adjacent the slot may have friction reducing surfacing, such as high density polymer inserts.

FIGS. 8A and 8B show two exemplary embodiments of the mechanism for raising and lowering the telescoping plates of FIG. 7. In FIG. 8A, the lever arm 32 actuates a reversing mechanism comprising gear 80 and rack (gear track) 82. The gear 80 is shown schematically in FIG. 7. As the lever arm 32 and roller 56 are moved forwardly and down as shown by Arrow K, the secondary plate 26 descends into its retracted position as shown by Arrow X. As shown above in FIGS. 1–6, the entire rolltop assembly can pivot on pivot axis 28 by virtue of the hinge assembly 24 at the forward end of the platform 10; this is shown by Arrow U (see also FIGS. 1–3). The rotational direction of the gear 80 is shown by the arrow on the gear. Note that as the lever arm moves down, the primary plate gear 80 rotates clockwise which in turn causes the secondary plate 26 to retract. Gear 80 is journaled to freely rotate on an axle 88 attached to the upper edge of the keeper plate 90. Reversing the motion of lever arm 32 causes the plate 26 to rise. In FIG. 8A the platform is shown filly retracted as well as the secondary plate being in its retracted position. It is well within the skill of those in the art to make such suitable adjustments in dimensions and placement as may be needed for full operational functionality.

FIG. 8B shows a cable or chain system for raising or lowering the secondary plate. In this figure, the plate is shown elevated before the lever arm 32 comes into contact with the header channel 5 upon retraction of the platform 10 as shown by Arrow P. In the FIG. 8B embodiment, note the cable is attached at the lower end by connector 67 to the pully 36 which is rotated by lever arm 32 on the shaft 34. As the lever rotates clockwise to the right upon contact of the arm with the header 5, the cable 67 unwinds. The cable is routed over the shaft or small pully 84 and secured to the bottom of the plate 26 at connector 86. The ranges of motion of the arm 32 is shown by contrasting FIGS. 8A and 8B. The actuator arm 32 in both embodiments may be spring biased to cause its counterclockwise rotation, thereby raising plate 26, or it may be linked to the lift chain 40 (not shown in FIGS. 7, 8A or 8B, but shown in FIG. 2), or through other power drive mechanisms (not shown). Likewise, it should be understood that the primary plate 22 in the three FIGS. 7, 8A and 8B is raised and lowered as described above by linkage to chain 40.

It is clear that the improved safety barrier rollstop of this invention has wide industrial applicability to wheelchair lifts as it provides a tall enough barrier to meet runaway wheelchair safety standards, yet is stowable into a compact configuration permitting its usage in a wide variety of lifts, and in particular to lifts stowed under a vehicle floor or in a location which has restricted clearance.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be and equivalents thereof.

What is claimed is:

1. In a wheelchair lift mountable on a vehicle adjacent a vehicle doorway and including:
   i) a platform having an inboard end and an outboard end, said platform being movable between at least a stowed position, a transfer level position and a ground level position;
   ii) an outboard rollstop comprising at least one primary plate having a upper edge and a lower edge, said primary plate being pivotally mounted by a first pivot adjacent said lower edge of said primary plate and adjacent to said outboard end of said platform;
   iii) means for pivoting said rollstop between at least a lowered deployed position extending generally horizontally outboard from said platform to provide for exit and entry of a wheelchair from said platform, and a raised, generally vertical safety barrier position extending upward from said platform to form a rollstop safety barrier against wheelchairs moving over said outboard end of said platform;
   the improved outboard rollstop further comprising:
   a) at least one secondary plate having a first edge and a second edge, said secondary plate being pivotally mounted by a second pivot adjacent said first edge to said primary plate adjacent said upper edge; and
   b) linkage which rotates said secondary plate about said second pivot between at least:
      i) an extended position generally coplanar to said primary plate when said rollstop is in said lowered deployed position and also when said rollstop is pivoted to said raised safety barrier position to vertically extend the profile of said rollstop and provide increased security to wheelchair occupants on the platform; and
      ii) a folded position at an angle with respect to the plane of said primary plate so that the plates are not substantially coplanar with respect to each other to decrease the vertical height of said rollstop when the rollstop is in a non-deployed position.

2. An improved rollstop as in claim 1, wherein:
   a) one of said primary and said secondary plates is oriented substantially perpendicular to said platform when said rollstop is in said raised safety barrier position.

3. An improved rollstop as in claim 2 wherein said folded position of said secondary plate in the rollstop non-deployed position is generally perpendicular to said primary plate.

4. An improved rollstop as in claim 1, wherein said wheelchair lift is selected from a UFL, a UVL, a parallelogram lift, a rotary arm lift and a header-type lift.

5. An improved rollstop as in claim 1, wherein said secondary plate is rotated about said second pivot downward and towards the inboard end of said platform.

6. An improved rollstop as in claim 1, wherein said rotation linkage includes a direction-reversing mechanical actuator assembly.

7. An improved rollstop as in claim 6, wherein
   a) said wheelchair lift has a lift support structure mounted to said vehicle; and
   b) said direction-reversing mechanical actuator comprises at least one actuating arm pivotally mounted to said primary plate which contacts and slidingly engages one of the lift support structure and the vehicle structure when said platform is moved to said stowed position, said sliding engagement causing said arm to rotate.

8. An improved rollstop as in claim 7, wherein said direction-reversing mechanical actuator comprises:
   a) a first pulley fixedly mounted to said secondary plate substantially coaxial with said second pivot;
   b) a second pulley pivotally supported by said primary plate and fixedly connected to said actuator arm; and
   c) a tension member connecting said first pulley and said second pulley along at least a portion of the perimeters thereof to link rotation of said arm to rotation of said secondary plate.

9. An improved rollstop as in claim 8, wherein said tension member is a chain or cable.

10. In a wheelchair lift having an outboard rollstop mounted to the outboard end of lift platform and having a rollstop folding mechanism, the improvement comprising:
   a) said rollstop is a multi-plate rollstop; and
   b) said folding mechanism includes linkage which changes the position of said plates between a first, extended height safety barrier configuration in which said plates are generally co-planar and a second, reduced height configuration, wherein said rollstop has a lowered deployed position in which said plates are generally co-planar and extend in an outboard direction from the outboard end of the lift platform.

11. An improved wheelchair lift as in claim 10, wherein said wheelchair lift is selected from a UFL, a UVL, a parallelogram lift, a rotary arm lift and a header-type lift.

12. An improved wheelchair lift as in claim 11 wherein said multi-plate rollstop is selected from a folding and a telescoping rollstop.

13. The improved wheelchair lift as in claim 10, wherein:
   a) said rollstop is a folding rollstop which includes a primary plate and at least one secondary plate pivotally connected to said primary plate; and
   b) said linkage rotates said secondary plate with respect to said primary plate between at least:
      i) an extended safety barrier position generally coplanar to said primary plate, and
      ii) a folded position at an angle with respect to the plane of said primary plate so that said plates are not substantially coplanar with respect to each other.

14. An improved wheelchair lift as in claim 13, wherein:
   a) one of said primary and said secondary plates is oriented substantially parallel to said platform when said rollstop is in said folded position; and
   b) the other of said primary and said secondary plates is oriented substantially perpendicular to said platform when said rollstop is in said folded position.

15. An improved wheelchair lift as in claim 13, wherein said rollstop is a bifold rollstop and said secondary plate is generally perpendicular to said primary plate when said rollstop is in said folded position.

16. An improved wheelchair lift as in claim 13, wherein said rollstop is a bifold rollstop and said secondary plate is rotated with respect to said primary plate downward and towards the inboard end of said platform.

17. An improved wheelchair lift as in claim 10, wherein said linkage includes a direction-reversing mechanical actuator assembly.

18. An improved wheelchair lift as in claim 13, wherein:
   a) said wheelchair lift has a lift support structure mounted to a vehicle for moving said platform with respect to said vehicle; and
   b) said linkage includes a direction-reversing mechanical actuator comprising at least one actuating arm pivotally mounted to said primary plate which contacts and slidingly engages at least a portion of said lift support structure when said platform is moved, said sliding engagement causing said arm to rotate.

19. An improved wheelchair lift as in claim 18, wherein said direction-reversing mechanical actuator comprises:
   a) a first pulley fixedly mounted to said secondary plate;
   b) a second pulley pivotally supported by said primary plate and fixedly connected to said actuator arm; and
   c) a tension member connecting said first pulley and said second pulley along at least a portion of the perimeters thereof so that said rotation of said arm causes the rotation of said secondary plate.

20. An improved wheelchair lift as in claim 19, wherein said tension member is a chain or cable.

21. A method of increasing runaway wheelchair safety of a wheelchair platform having a rollstop, which lift cycles between a vehicle transfer level and a ground level, comprising the steps of:
   a) positioning at the outboard end of said wheelchair lift platform a rollstop having a plurality of panels, said panels in a first, non-deployed configuration having a height lower than when in a raised safety barrier position;
   b) changing the positions of said panels relative to each other from said lower height to said raised safety barrier position when said platform is at said vehicle transfer level and in transit to said ground level; and
   c) maintaining the positions of said panels relative to each other from said raised safety barrier position to a second deployed position in which said panels extend outboard from said outboard end of said wheelchair lift platform.

22. A method as in claim 21, wherein said rollstop position changing step includes rotationally unfolding at least one panel of said rollstop relative to another to increase said height of said rollstop in said raised safety barrier position.

23. A method as in claim 21 wherein said rollstop position changing step includes telescopingly extending at least one panel of said rollstop relative to another to increase said height of said rollstop in said raised safety barrier position.

24. A method as in claim 21 wherein the height of the upper edge of said rollstop is increased to at least 7" above said lift platform.

25. A method as in claim 22 wherein said step of unfolding at least one of said rollstop panels includes:
   a) actuating a reversible linkage to selectively either:
      i) fold said rollstop to a bifold or trifold configuration to reduce the height of said rollstop from said raised safety barrier position to said non-deployed configuration; or
      ii) unfold said rollstop into said raised safety barrier position.

26. The method as in claim 25 wherein:
   a) said actuating step includes rotating a reverse-motion linkage which pivots at least one panel into a raised position upon deployment to said safety barrier position, or lowers at least one panel upon folding into a non-deployed configuration.

27. A method as in claim 25 wherein:
   a) said actuating step includes moving said platform relative to at least a portion of said lift into engagement with said linkage to fold or unfold said rollstop panels.

28. A method as in claim 21 wherein said lift is selected from a UFL, a UVL, a parallelogram lift, a rotary arm lift, and a header-type lift.

29. A method as in claim 23 wherein said step of telescoping at least one rollstop panel includes:
   a) actuating a reversible linkage to selectively either:
      i) telecopingly retract at least one of said panels relative to another panel to reduce the height of said rollstop from said safety barrier configuration to said lower height; and
      ii) telescopingly extend at least one of said panels relative to another panel to increase the height of said rollstop from said lower height to said raised safety barrier configuration.

30. A method as in claim 29 wherein:
   a) said actuating step includes moving said platform relative to at least a portion of said lift into engagement with said linkage to telescopingly extend or retract said panel.

* * * * *